US007768994B2

(12) United States Patent
Tuomainen et al.

(10) Patent No.: US 7,768,994 B2
(45) Date of Patent: Aug. 3, 2010

(54) DATA TRANSMISSION METHOD AND APPARATUS

(75) Inventors: Petri Tuomainen, Espoo (FI); Teemu Tarnanen, Espoo (FI)

(73) Assignee: Nokia Corporation, Espoo (FI)

( * ) Notice: Subject to any disclaimer, the term of this patent is extended or adjusted under 35 U.S.C. 154(b) by 1284 days.

(21) Appl. No.: 10/134,295

(22) Filed: Apr. 26, 2002

(65) Prior Publication Data

US 2002/0163938 A1 Nov. 7, 2002

Related U.S. Application Data

(63) Continuation of application No. PCT/EP99/09416, filed on Dec. 2, 1999.

(51) Int. Cl.
*H04L 12/28* (2006.01)
*H04Q 7/24* (2006.01)
*H04Q 7/20* (2006.01)
*H04J 3/16* (2006.01)
*H04J 3/22* (2006.01)

(52) U.S. Cl. .................... 370/351; 370/338; 370/468; 455/422.1; 455/440

(58) Field of Classification Search ................ 455/436, 455/450; 370/351, 352, 357, 431
See application file for complete search history.

(56) References Cited

U.S. PATENT DOCUMENTS

| 5,574,724 | A | * | 11/1996 | Bales et al. ................ 370/410 |
| 5,590,127 | A | * | 12/1996 | Bales et al. ................ 370/260 |
| 5,708,663 | A | * | 1/1998 | Wright et al. .............. 370/524 |
| 5,722,074 | A | * | 2/1998 | Muszynski ................. 455/442 |
| 5,729,532 | A | * | 3/1998 | Bales et al. ................ 370/261 |
| 6,122,510 | A | * | 9/2000 | Granberg ................... 455/433 |
| 6,269,402 | B1 | * | 7/2001 | Lin et al. ................... 709/227 |

(Continued)

FOREIGN PATENT DOCUMENTS

WO 9724007 7/1997

(Continued)

OTHER PUBLICATIONS

"Wireless Application Protocol Wireless Datagram Protocol Specification", Wireless Application Forum, Apr. 30, 1998, pp. 14-37.

*Primary Examiner*—Ayaz R Sheikh
*Assistant Examiner*—Blanche Wong
(74) *Attorney, Agent, or Firm*—Alfred A. Fressola; Ware, Fressola, Van Der Sluys & Adolphson LLP (57) ABSTRACT

A data transmission method and apparatus for performing a data transmission between end terminals of a telecommunication network, where the data is transmitted from at least one of the end terminals using the first data bearer. Then, data transmission is switched from the first to the second data bearer, if a predetermined bearer need condition has been determined or in order to obtain a subscriber identity used for gathering charging data. The network service provided by the operator can be improved, since the bearer switching allows an increase of the overall speed of the data transmission, an adaptation of the bearer bandwidth to the data amount, and a provision of the subscriber identity. The first data bearer may be a USSD or SMS data bearer, and the second data bearer may be a circuit-switched data bearer or a GPRS bearer, or vice versa.

34 Claims, 4 Drawing Sheets

U.S. PATENT DOCUMENTS

| | | | |
|---|---|---|---|
| 6,496,690 B1 * | 12/2002 | Cobo et al. | 455/408 |
| 6,549,773 B1 * | 4/2003 | Linden et al. | 455/426.1 |
| 6,691,273 B2 * | 2/2004 | Wager et al. | 714/751 |
| 7,069,008 B1 * | 6/2006 | Hill et al. | 455/434 |
| 7,254,392 B2 * | 8/2007 | Kauhanen | 455/436 |
| 2001/0010685 A1 * | 8/2001 | Aho | 370/329 |
| 2002/0006793 A1 * | 1/2002 | Kun-Szabo et al. | 455/426 |
| 2002/0032595 A1 * | 3/2002 | Hundscheidt et al. | 705/8 |
| 2003/0157935 A1 * | 8/2003 | Kauhanen | 455/436 |

FOREIGN PATENT DOCUMENTS

| | | |
|---|---|---|
| WO | 9726765 | 7/1997 |
| WO | 9823110 | 5/1998 |
| WO | 9914877 | 3/1999 |
| WO | 9930512 | 6/1999 |

* cited by examiner

DATA TRANSMISSION METHOD AND APPARATUS

CROSS-REFERENCE TO RELATED APPLICATIONS

This application is a continuation of International Application PCT/EP99/09416 having an International Filing Date of 2 Dec. 1999 and from which priority is claimed under all applicable sections of Title 35 of the United States Code including, but not limited to, Sections 120, 363 and 365(c).

FIELD OF THE INVENTION

The present invention relates to a method and apparatus for performing a data transmission between end terminals of a telecommunication network, such as a data transmission between a client and an origin server via a cellular network.

BACKGROUND OF THE INVENTION

In the next few years, multimedia applications will in full scale enter the world of cellular communications. To support new services, which will set new demands on the infrastructure for radio communications, a new wireless communication system needs to be developed. To meet these demands of wireless mobile communication in a true multimedia environment, high speed packed data and Internet bearer services play major roles.

The future of mobile telephony is now being determined by the global standardization work conducted by public authorities and the industry. Wireless Application Environment (WAE) is a result of the Wireless Application Protocol (WAP) efforts to promote industry-wide standards and specifications for developing applications and services that operate over wireless communication networks. WAE specifies an application framework for wireless devices such as mobile telephones, pagers and PDAs (Personal Digital Assistants). The framework extends and leverages other WAP technologies, including Wireless Transaction Protocol (WTP) and Wireless Session Protocol (WSP), as well as other Internet technologies such as scripting and various content formats. The effort is aimed at enabling operators, manufacturers and content developers to meet the challenges of implementing advanced differentiating services and applications in a fast and flexible manner.

WAE adopts a model that closely follows the WWW (World Wide Web) model. All content is specified in formats that are similar to the standard Internet formats. The content is transported using standard protocols in the WWW domain and an optimized protocol similar to HTTP (Hyper Text Transfer Protocol) in the wireless domain. The WAE architecture allows all content and services to be hosted on standard Web origin servers. All content is located using WWW standard URLs (Uniform Resource Locators).

WAE enhances some of the WWW standards in ways that reflect the device and network characteristics. WAE extensions are added to support Mobile Network Services such as Call Control and Messaging. Careful attention is paid to the memory and CPU processing constraints that are found in mobile terminals. Support for low bandwidth and high latency networks is included in the architecture as well.

WAE assumes the existence of a gateway functionality responsible for encoding and decoding data transferred from and to the mobile client. The purpose of encoding content delivered to the client is to minimize the size of data sent to the client over-the-air as well as to minimize the computational energy required by the client to process that data. The gateway functionality can be added to origin servers or placed in dedicated gateways.

In the mobile stations of the mobile network, a software or device, called user agent, is provided that interprets a network content referenced by a URL. This may include textural browsers, voice browsers, search engines and the like.

The user agent is connected to the mobile network using dedicated signaling connections. The origin server communicates with the client using the WAP protocol stack, may be connected to the mobile network and is responsible for deploying content to its clients. In the case of call-handling, for example, the mobile network sets up the call to the client, the server delivers the event-handling content, and the user agent invokes the event-handler content and manages the presentation of the call-handling service to the user.

However, in case a circuit switched data bearer (CSD bearer) is used for transmitting data between the server and the mobile client, the call set-up time is relatively high, eg. 15-60 s depending on the solution. Thus, the end user has to wait for the connection and cannot use its mobile phone.

Moreover, the user agent may have a very rigid and real-time context management. For example, the user agent may drop outdated (or stale) events, may not place intermediate results on the history stack, and may typically terminate after the event is handled. Hence, the success of content delivery (eg. handling of call control) is, to some extent, dependent on the operator's ability to access and control the speed of the mobile network.

Furthermore, when a mobile terminal communicates over an IP bearer by using e.g. CSD or GPRS (General Packet Radio Service) with an external gateway such as a WAP gateway, the MSISDN of the mobile terminal is not known by the gateway. Therefore, the operator may only charge the user for the used airtime (e.g. in case of a CSD connection) or for the sent data packets (e.g. in case of GPRS connection). However, a charging per used service is not possible, since the required IP address is usually allocated dynamically by an access server (e.g. in case of the CSD connection) or by an SGSN (Serving GPRS Support Node). Hence, an association between the MSISDN and the IP address is not available.

SUMMARY OF THE INVENTION

It is therefore an object of the present invention to provide a data transmission method and apparatus for improving the network service provided by the operator in a data transmission between an origin server and a mobile client.

This object is achieved by a method for performing a data transmission between end terminals of a telecommunication network, comprising:

initiating the data transmission from at least one of the end terminals using a first data bearer; and switching the data transmission to a second data bearer, when a predetermined bearer need condition of the second data bearer has been determined.

Additionally, the above object is achieved by an apparatus for performing a data transmission between end terminals of a telecommunication network, comprising:

switching control means (e.g. a bearer switch control) for controlling a transmission means (e.g. a transmitter of a transceiver) so as to initiate said data transmission from at least one of said end terminals using a first data bearer; and detecting means (e.g. a detector) for detecting a predetermined bearer need condition;

wherein said switching control means is arranged to control said transmission means so as to switch to said second data bearer in response to the detection result of said detection means.

Accordingly, end users can be released from the duty of selecting a suitable data bearer, and the operator is able to control the data bearers used. Alternatively, WAP applications can tell the WAP gateway the best data bearer from their point of view. Hence, a control can be achieved in such a manner that long-term WAP sessions load traffic channels instead of control channels.

The predetermined bearer need condition may be the completion of a set-up phase of the second data bearer. Then, an additional or auxiliary data bearer without a call set-up time may temporarily be used instead of the main data bearer during the period when the main data bearer is being established. Thereby, the delivery time of the content can be reduced, since a part of the content may already be transmitted using the first data bearer during the set-up phase of the second data bearer.

Thus, the network service is improved, since the WAP session starts immediately without a call set-up time, while the transmission capacity is optimized.

Furthermore, the bearer need condition may be determined on the basis of the amount of data to be transmitted. The amount of data may be determined e.g. from a service address, a content size and/or a content type of a service information to be transmitted. Thereby, an initial bearer can be changed to a bearer having a narrower bandwidth, if there is not so much content to be retrieved. Hence, network load can be reduced and service improved.

Preferably, the first data bearer is a USSD (Unstructured Supplementary Service Data) bearer or an SMS (Short Message Service) bearer, and the second data bearer is a circuit-switched data bearer or a GPRS bearer. Thus, the user agent may start content retrieval using the USSD or SMS bearer so as to provide a fast service delivery, wherein the circuit-switched data bearer is used after the set-up thereof.

Alternatively, the first data bearer may be a circuit-switched data bearer, and the second data bearer a USSD (Unstructured Supplementary Service Data) bearer or an SMS (Short Message Service) bearer, to thereby switch to a narrow bandwidth bearer if only a little amount of data is to be transmitted.

The data transmission may be used for a browsing operation between an origin server and a mobile client, i.e. a retrieving operation for retrieving a WAP content from an origin server. In this case, an IN-numbered translation can be used to determine the number of an IN access server. In particular, the numbered translation may be determined by a CAMEL (Customized Applications for Mobile Network Enhanced Logic) support. The IN access server may be a WAP gateway. Accordingly, a universal IN number can be used for addressing the WAP gateway or the origin server.

Preferably, the switching operation may be performed during the downloading of a specific content entity using the first bearer, so that the remaining content is swapped to the second bearer. Thus, a transport protocol mechanism for using multiple bearers in parallel could be implemented.

Furthermore, the second data bearer may be changed to the first data bearer in dependence on the amount of data to be transmitted. Thereby, the main second data bearer could be changed back to the subsidiary first data bearer if there is not very much content to be downloaded.

Furthermore, the switching step may comprise a WAP session suspend and resume operation, wherein a WAP session is suspended via the first data bearer and resumed via the second data bearer. Thus, the present invention can be easily implemented by using existing WAP session protocol features.

The switching control means may be arranged to control the transmitting means so as to switch to the second data bearer during a downloading of a specific content entity from an origin server to a mobile station using the first data bearer, so that the remaining content is swapped to the second data bearer.

Furthermore, the switching control means may be controlled by an information transmitted from a user agent means provided in the mobile station. Thus, the user agent means starts content retrieval using the first data bearer by transmitting a corresponding information to the switching control means of the data transmission apparatus. When the data transmission apparatus gets informed either from the origin server or from the mobile station that the second bearer set-up is complete, the data transmission apparatus starts using the second bearer.

In particular, the data transmission apparatus may be a WAP gateway, wherein the switching control means is arranged to perform the switching operation by using a WAP session suspend and resume operation.

Alternatively, the data transmission apparatus may be provided in an origin server.

Furthermore, the above object is achieved by a method for performing a data transmission between end terminals of a telecommunication network, said method comprising the steps of:

initiating said data transmission from at least one of said end terminals using a first data bearer;

switching said data transmission to a second data bearer; and using a subscriber identity, obtained from the data transmission with said first data bearer, for gathering subscriber charging data.

Additionally, the above object is achieved by an apparatus for performing a data transmission between end terminals of a telecommunication network, said apparatus comprising:

switching control means for controlling a transmission means so as to initiate said data transmission from at least one of said end terminals using a first data bearer; and detecting means for detecting a subscriber identity from the data transmission with said first data bearer;

wherein said switching control means is arranged to gather subscriber charging data by using said detected subscriber identity.

Accordingly, a cheap and reliable service-specific charging function can be established, which does not require any additional network elements for providing the subscriber identity and/or IP address of a requested service. Moreover, roaming of the user does not cause any problems, since the subscriber identity is derived from the data bearer. Thus, the network service provided by the operator can be improved.

Preferably, the first data bearer is a USSD (Unstructured Supplementary Service Data) bearer or an SMS (Short Message Service) bearer, and the second data bearer is a circuit-switched data bearer or a GPRS bearer. Thereby, the MSISDN can be obtained from the USSD or SMS bearer.

Furthermore, the above object may be achieved by a terminal equipment for a telecommunication network, comprising:

input means for activating a browser function; and browser means responsive to the input means, for starting a content retrieval from an origin server by using a first and a second data bearer, wherein said content retrieval is performed by using said first data bearer during the set-up of said second data bearer.

Preferably, the terminal equipment is provided in a mobile terminal.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
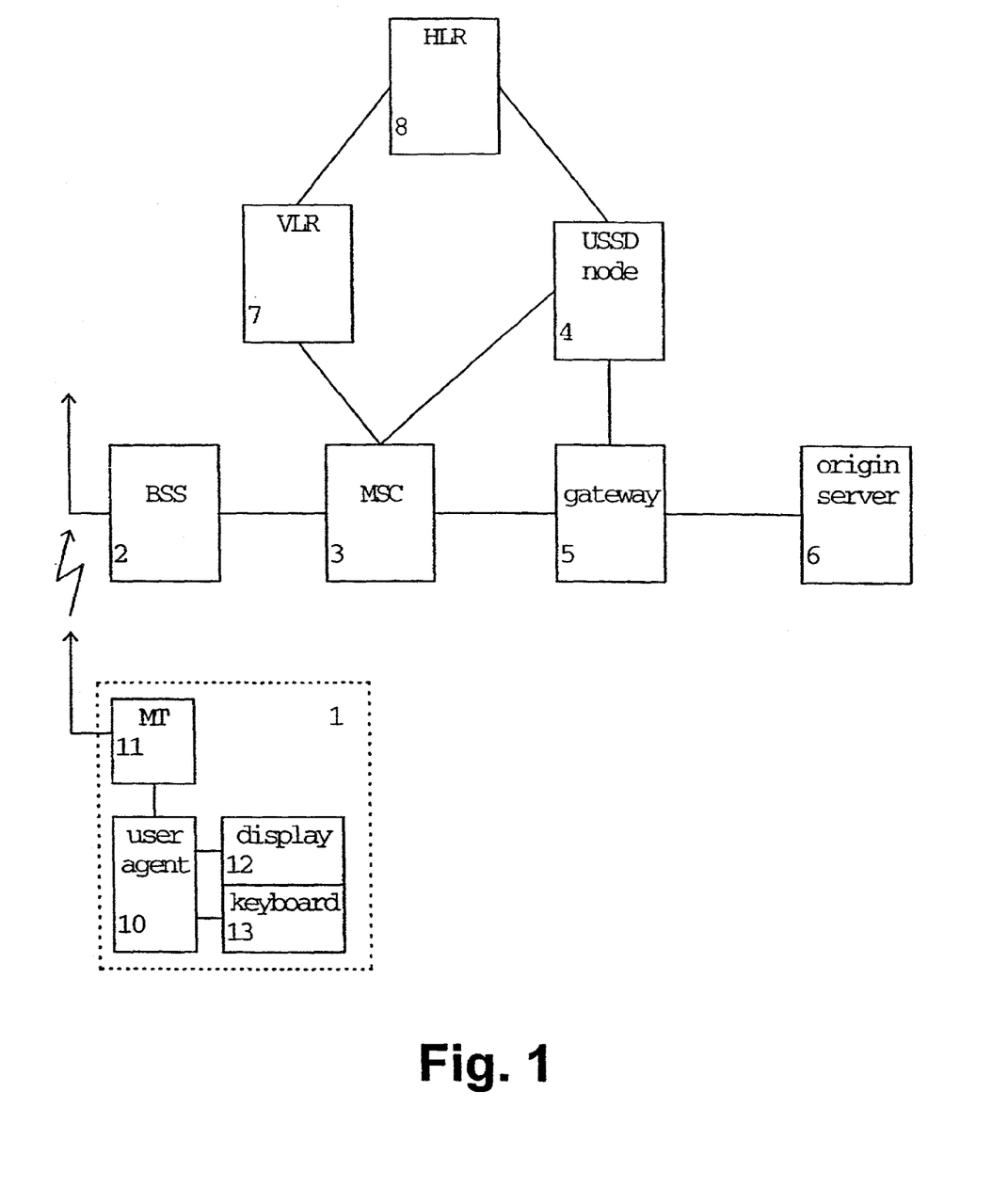
FIG. 1 shows a basic block diagram of a mobile network connected via a gateway to an origin server.

In the following, the preferred embodiment of the present invention will be described on the basis of a data transmission between a server and a mobile client, as shown in FIG. 1.

According to FIG. 1, a mobile station 1 comprising a mobile terminal 11 and a user agent 10 is radio-connected to a Base Station Subsystem (BSS) 2 of a mobile network such as a GSM network. The user agent 10 may be any browser software or device that interprets content submitted from an origin server 6 connected to the mobile station 1. Furthermore, the mobile station 1 comprises a display 12 and a keyboard 13 so as to provide a Man Machine Interface (MMI) to a user. As an example, a user of such a WAP-compliant mobile telephone requests content using a specific URL input by using the keyboard 13. The received content relating to the specific URL is then displayed at the display 12.

Furthermore, the mobile network comprises a Mobile Switching Center (MSC) 3 arranged for performing all switching functions for mobile stations located in a geographical area designated as an MSC area. The MSC 3 takes into account the impact of the allocation of radio resources and the mobile nature of the subscribers and has to perform, for example, procedures required for the location registration and procedures required for hand-over of respective mobile stations. The MSC 3 is connected to the BSS 2, which is a sub-system of base station equipment, such as transceivers, controllers, and the like, viewed by the MSC 3 through a single interface.

The MSC 3 is connected to a gateway 5 (e.g. a WAP gateway) which comprises a functionality responsible for encoding and decoding data transferred from and to a mobile client, such as the mobile station 1. The purpose of encoding content delivered to the client is to minimize the size of data sent to the client over-the-air as well as to minimize the computational energy required by the client to process said data. The gateway 5 provides a connection to an origin server 6 of a fixed network such as the Internet or another IN (Intelligent Network). The origin server 6 responds to a content request from a user agent with the requested data expressed in one of the standard formats known to the user agent, e.g. HTML.

Thus, content data may be transmitted from the origin server 6 via the gateway 5, the MSC 3 and the BSS 2 to the mobile station 1 by using a circuit-switched data bearer (CSD bearer).

In addition thereto, a USSD node (USSD center) 4 connected to the MSC 3 and the gateway 5 is provided in the mobile network. The USSD node 4 enables a communication of data messages, i.e. unstructured data, between the mobile station 1 and the origin server 6 via the gateway 5. In particular, there may be two ways of connecting the USSD node 4 to the mobile network.

First, the USSD node may be connected to the MSC 3 via a Home Location Register (HLR) 8 which is a data base in charge of the management of mobile subscribers. All subscription data are stored there, such as an International Mobile Subscriber Identity (IMSI) and a location information (VLR number) of each MS in order to be able to route calls to the mobile subscribers managed by the HLR 8. A mobile initiated USSD message is then routed to the HLR 8 via an additional Visitor Location Register (VLR) 7 used for controlling MSs roaming in the MSC area of the MSC 3. The VLR 7 is a data base containing information needed to handle the calls set up or received by the MSs registered therein. Thus, the USSD message takes the following path: MS 1→BSS 2→MSC 3→VLR 7→HLR 8→USSD node 4→gateway 5. A network initiated USSD message takes the opposite path.

Second, the USSD node 4 may be connected to the GSM network directly via the MSC 3. However, in this case, only a mobile initiated USSD is possible. The USSD message is then routed via the following path: MS 1→BSS 2→MSC 3→USSD node 4→gateway 5.

Thus, a USSD bearer can be used as a transparent pipe through the GSM network. In particular, the USSD bearer can be used by operators to provide operator-specific services using a similar transport mechanism as when standard GSM supplementary services are used.

The protocol designed to hide the complexity of the USSD dialogue is the USSD Dialogue Control Protocol (UDCP). UDCP is mapped directly onto the USSD Protocol. The UDCP protocol layer is located in the USSD node 4. A service code identifies the USSD node 4 and is an operator-specific parameter, just like the address of an SMS-center. The user has to manually enter the service code when invoking a service, or it could be entered once as a "setting" in an application (e.g. phone directory) in the MS 1. The service code is sent in the USSD string based on a predefined format defined in the GSM specifications. Thus, the HLR 8 (or the MSC 3 depending on the selected routing path) identifies, based on the service code, the right USSD node 4 towards which a USSD dialogue is to be established. The USSD message is routed to the HLR 8 based on the subscriber's IMSI.

In case of a content request from the origin server 6, the gateway 5 can be connected to the USSD node 4. In this case, the address of the gateway 5 must be included in the USSD string. In particular, the address field must contain an address type (e.g. IP-address, MSISDN, etc.) and the address itself. An address field for this purpose is included in the UDCP protocol header.

Instead of using a specific address for the gateway 5, the service code to the USSD node 4 can be mapped to a specific external node. In this case, the address field in the UDCP protocol header is omitted. For example, a network operator can decide that all USSD dialogues established with a specific service code should be associated with the gateway 5.

In a similar manner, a GSM short message (SMS) can be used to provide an additional data bearer to the gateway 5 in order to access the origin server 6. In GSM SMS, the user data field may comprise just the short message itself or a header in addition to the short message. In this case, the data message is routed via a respective SMS center (which may be the MSC 3 or another network node of the GSM network) to the gateway 5.

According to the preferred embodiment of the present invention, when a user activates the user agent 10 by using the keyboard 13, the user agent 10 starts a set-up of a circuit-switched data bearer towards the gateway 5. Simultaneously or in parallel thereto, the user agent 10 starts or initiates a content retrieval using a USSD or an SMS bearer. Thereby, content data can be transmitted from the origin server 6 to the mobile station 1 by using the SMS or USSD bearer, while the circuit-switched data bearer is being set-up. When the gateway 5 gets informed either by a data call access server (not shown) or the mobile station 1 that the CSD bearer set-up is completed, the gateway 5 dynamically changes the data bearer and starts using the CSD bearer for transmitting the remaining content requested by the user agent 10.

The data call access server is located at the gateway 5 and arranged to provide an IP connection to the gateway 5. It is noted that the access server may as well be integrated into the gateway 5. The address number (e.g. IN number) of the access server can be determined in the GSM network by a corresponding IN number translation. In this case, the user is provided with a universal number which can be translated to the number of the access server or the gateway 5. This number translation may be performed by a CAMEL functionality of the GSM network.

Figure 2:
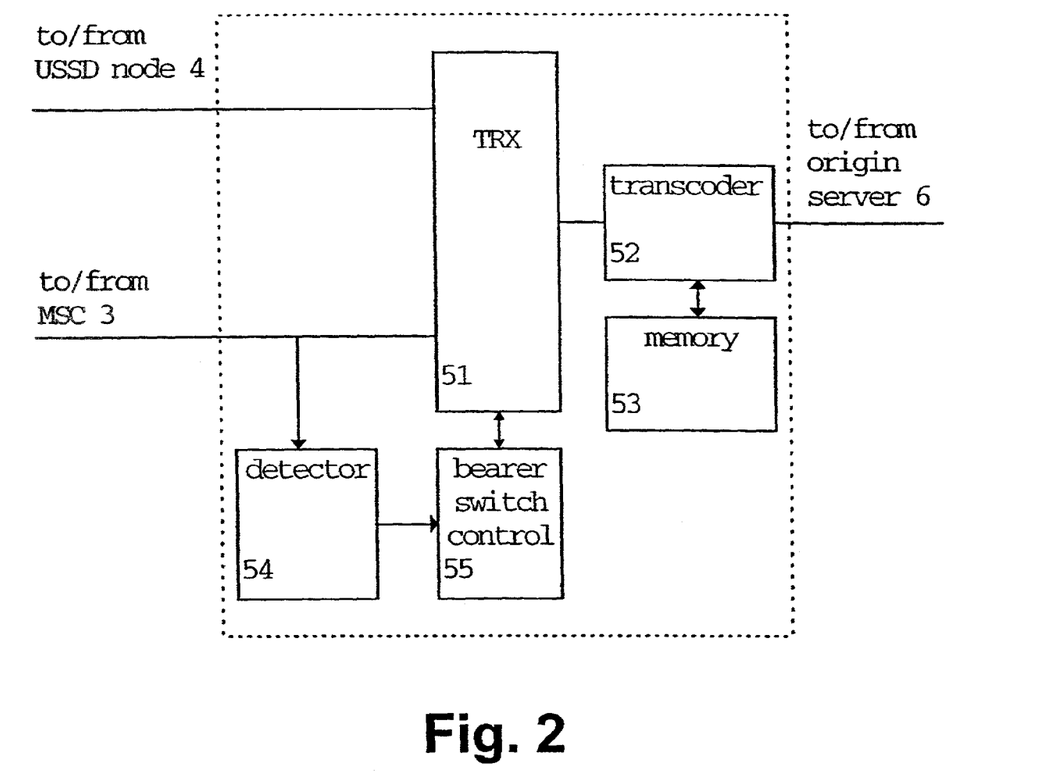
FIG. 2 shows a basic block diagram of a data transmission apparatus according to the preferred embodiment of the present invention.

FIG. 2 shows a basic block diagram of a data transmission apparatus according to the preferred embodiment, implemented in the gateway 5. In FIG. 2, only those parts of the gateway 5 are shown which are required for implementing the present invention. According to FIG. 2, the gateway 5 comprises a transceiver (TRX) unit 51 arranged for establishing and/or switching connections between the GSM network and a fixed IN network, e.g. the Internet. In particular, the TRX unit 51 comprises a first input terminal connected to the USSD node 4 in order to establish a USSD connection from the USSD node 4 towards the origin server 6. Furthermore, the TRX unit 51 comprises a second input terminal connected to the MSC 3 via the access server for establishing a TCP/IP (Transmission Control Protocol/Internet Protocol) connection from the access server towards the origin server 6, wherein the access server is then connected to the MSC 3 via a CSD connection. The switching function of the TRX unit 51 is controlled by a bearer switching control unit 55 which performs switching control so as to switch between the USSD bearer and the CSD bearer in the connection to the MS 1.

The bearer switching control unit 55 is connected to a detector 54 which is arranged to detect the completion of a set-up phase of the CSD bearer of the CSD connection. To achieve this, the detector 54 may be connected to the second input terminal connecting the CSD connection, or to any other suitable terminal of the gateway 5. The detector 54 may determine the set-up completion either by an information obtained from the access server or by an information obtained from the mobile station 1.

Furthermore, the gateway 5 comprises a transcoder 52 connected between the TRX unit 51 and the output terminal, and arranged for encoding and decoding data transferred from and to a mobile client. The transcoder 52 is connected to a memory 53 in order to provide a buffer function for the content delivered by the origin server 6.

In the following, a data transmission (e.g. downloading) from the origin server 6 to the mobile station 1 is described on the basis of a message transmission diagram comprising two examples shown in the upper and lower part of FIG. 3, respectively.

According to the upper first example, when a user of the mobile station 1 activates the browser function of the user agent 10 by the keyboard 13 or another suitable input means, the user agent 10 of the mobile station 1 issues a CSD bearer set-up request via the MSC 3 to the access server which provides an IP connection to the gateway 5.

Simultaneously, the user agent 10 starts content retrieval using a USSD bearer. In particular, the user agent 10 transmits data by issuing a UDCP data request primitive either via the MSC 3 directly or via the MSC 3 and the HLR 8 to the USSD node 4. The address of the gateway 5 may be included in the service code of the USSD dialogue, or an additional address may be used to address the origin server 6. Once the dialogue has been established, the USSD node 4 functions as a relay and passes data between the mobile station 1 and the gateway 5. Thus, the user agent 10 of the mobile station 1 can use the USSD bearer to communicate with the gateway 5 identified by the service code.

Having received the USSD request, the TRX unit 51 of the gateway 5 issues a content request included in the USSD message to the origin server 6 specified by the respective URL. A content generator of the origin server 6 generates standard content formats in response to the request from the user agent 10 of the mobile terminal 1, and transmits the content to the gateway 5. The content is encoded at the transcoder 52 and transmitted by the TRX unit 51 as a USSD message to the USSD node 4, which forwards the content (USSD message) via the established USSD path to the MS 1.

When the gateway 5 gets informed either by the access server or the mobile station 1 that the requested CSD bearer set-up is completed, the detector 54 detects the completion, and issues a corresponding detection result to the bearer switching control unit 55. Then, the bearer switching control unit 55 controls the TRX unit 51 so as to change or switch to the TCP/IP and CSD connection using the CSD bearer between the access server and the mobile station 1. Then, the remaining content entities, eg. WAP decks, received from the origin server 6 or stored in the memory 53 are downloaded via the access server, i.e. by using the CSD bearer.

Thus, the content is initially downloaded by using the quickly established USSD bearer and the changing to the CSD bearer having the higher capacity when the set-up of the CSD bearer has been confirmed. Thereby, a fast data transmission between the origin server 6 and the mobile station 1 can be ensured.

Figure 3:
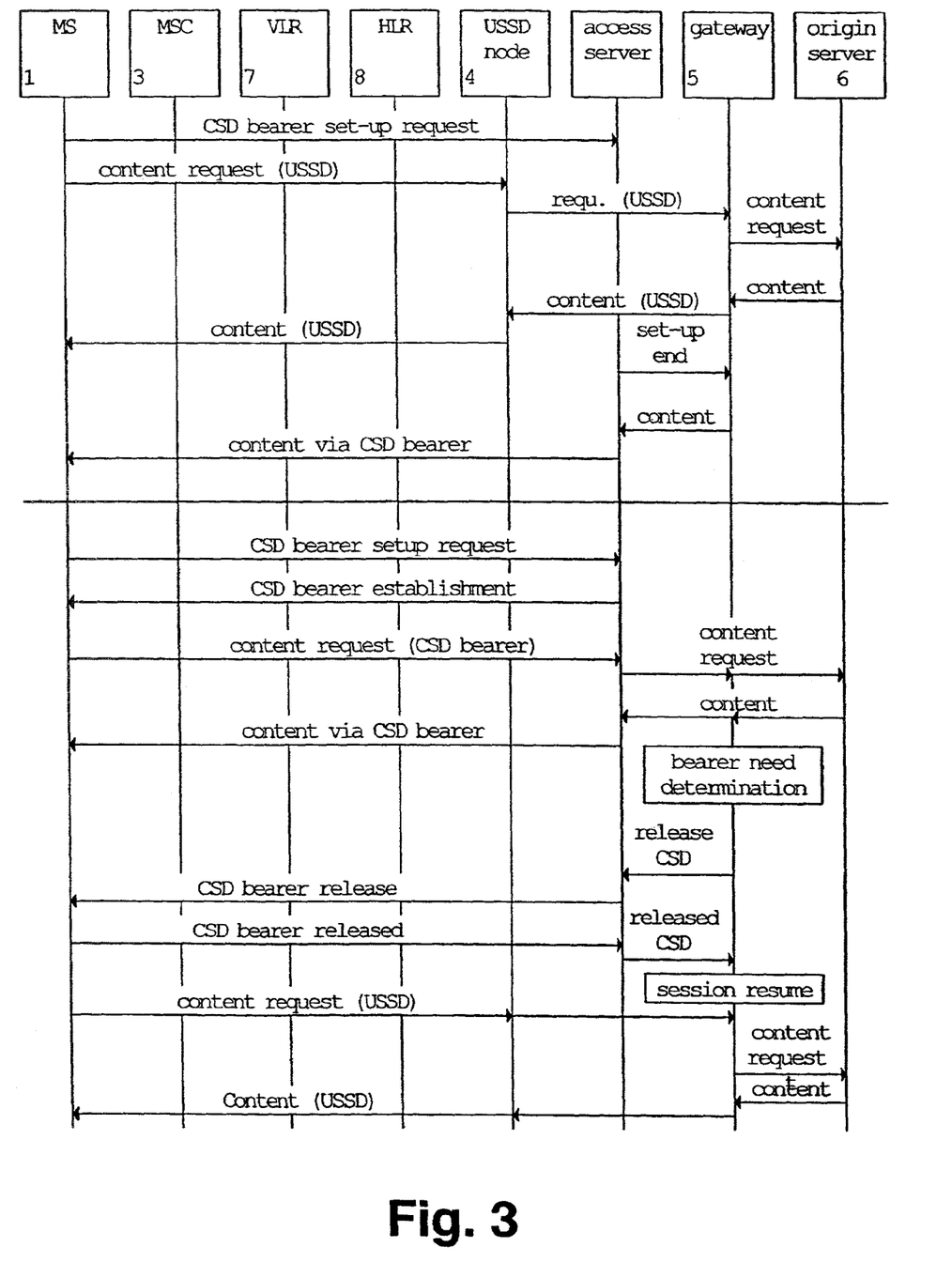
FIG. 3 shows an information flow diagram of two examples of a data transmission method comprising a bearer change procedure according to the preferred embodiment of the present invention.

According the alternative second example shown in the lower part of FIG. 3, it is also possible that the gateway 5 establishes a network initiated USSD session via the HLR 8 and the MSC 3, when there is not so much content to be retrieved.

In particular, an initial CSD bearer set-up request is issued by the mobile station 1. In response to the receipt of a subsequent bearer establishment confirmation, the mobile station 1 sends a content request via the CSD bearer to the access server which generates a corresponding IP content request transferred via the gateway 5 to the origin server 6. In response thereto, the origin server 6 sends the requested content information via the gateway 5 and the access server to the mobile station, using the CSD bearer between the access server and the mobile station 1. When the detector 54 of the gateway 5 detects or determines a predetermined bearer need condition requiring a change to a bearer with a narrower bandwidth, it controls the bearer switch control unit 55 so as to establish a USSD session towards the MS 1, and transmits the remaining content information, received from the origin server 6, via the USSD bearer to the MS 1.

The predetermined bearer need condition may be determined on the basis of the URL of the content, the content size, the content type (i.e. amount of data) or a passivity timer included in the detector 54 and arranged to count a time duration since the last content request. Thereby, a bearer change to the USSD bearer can be initiated in case a content with a small amount of data (i.e. small size) is to be retrieved. If the bearer need determination is directly based on the content size, a preliminary indication of the content size is needed to the gateway 5 from the origin server 6. Alternatively, the content information may as well be stored in the gateway 5.

The bearer change may be performed by the gateway 5 (e.g. bearer switch control unit 55) by transmitting a release request to the access server in order to release the CSD bearer. Then the session is suspended. When the release of the CSD bearer has been acknowledged from the mobile station 1 via the access server, the gateway 5 starts a session resume operation and waits for a content request via an USSD bearer from the mobile station 1. When the content request has been received by the gateway 5, a new content request is issued to the origin server 6. In response thereto, the origin server 6 supplies the requested content to the gateway 5 from which it is send to the mobile station 1 by using the narrow band USSD bearer. Thereby, network capacity can be saved.

Thus, the bearer switching control unit 55 can be arranged to perform control such that the CSD bearer is changed back to the USSD bearer based on the bearer need determination of the detector 54, e.g. if there is not very much content to be downloaded.

It is noted that the bearer release may as well be initiated by the mobile station 1 based on a corresponding determination operation.

If the mobile station 1 or the gateway 5 (e.g. detector 54) determine on the basis of the URL, an anticipated content size, or a content retrievel request that the CSD bearer must be re-established, the mobile station 1 or the gateway 5 (e.g. bearer switch control unit 55) may again request a CSD bearer set-up.

The above preferred embodiment can be extended by providing a mechanism in the wireless transport protocol (e.g. WAP) to use multiple bearers in parallel. In this case, the TRX unit 51 may switch multiple bearers to the origin server 6. Thereby, unsent content entities can be swapped to the CSD bearer even during the downloading of a specific content entity using the USSD bearer.

It is to be noted that the initial or narrow band content transmission may as well be performed by an SMS bearer via a corresponding SMS center, eg. the MSC 3, of the GSM network. In this case, the TRX unit 51 connects to the SMS center and uses the SMS bearer in response to the control of the bearer switching control unit 55. Moreover, any other data transmission bearer which can be established in a short duration can be used as the initial data bearer.

As an alternative example, the user agent 10 may start a WAP session and initiate a datacall (CSD bearer) to an IN number. The MSC 3 routes the datacall to the access server connected to the WAP gateway 5 based on a number conversion performed by the IN. Then, the IN may inform the gateway 5 to start a network initiated WAP over USSD (or SMS) session e.g. through an http interface. The gateway 5 may check whether the mobile station 1 supports WAP over USSD or WAP over SMS using a corresponding database provided in the gateway 5 or any other network element (eg. Home Location Register (HLR) or Visitor Location Register (VLR)). When it has been detected by the detector 54 that the set-up of the CSD bearer of the data call is complete, the bearer switching control unit 55 controls the TRX unit 51 so as to change the bearer dynamically from the USSD or SMS bearer to the CSD bearer.

Whether the mobile station 1 supports WAP over USSD may also be checked by pinging the mobile station 1, wherein the gateway 5 pings the mobile station 1 with a WCMP (Wireless Control Message Protocol) Echo Request (over USSD). Then, the mobile station 1 may answer with a WCMP Echo Reply, if it supports WAP over USSD. In this case, WAP over USSD can be used. If the mobile station 1 does not support WAP over USSD, it answers with an error message.

In general, the switching between the USSD or SMS bearer and the CSD bearer can be implemented or extended by using a WAP session suspend and resume operation which allow the use of a given session to be temporarily frozen. When the USSD or SMS bearer is to be changed to the CSD bearer, the session is suspended via the USSD or SMS bearer, and then resumed via the CSD bearer.

According to a third example of the preferred embodiment, the bearer change may be used by the gateway 5 to obtain charging data for a content retrieval. This can be achieved by gathering the charging data per MSISDN, since the user MSISDN is supplied to the gateway 5 when a USSD or SMS bearer is used. The MSISDN obtained by the gateway 5 from the USSD node 4 or the SMS center is reliable, since the mobile station 1 has been authenticated using the GSM authentication mechanism and the GSM network is closed and controlled by the operator all the way from the base transceiver station of the BSS 2 to the USSD node 4 or the SMS center.

The charging data gathered at the gateway 5 may comprise a user information (e.g. MSISDN), the content retrieved (URL) and a content retrieval time. Of course, the gateway 5 may as well forward this data to an operator billing system.

Figure 4:
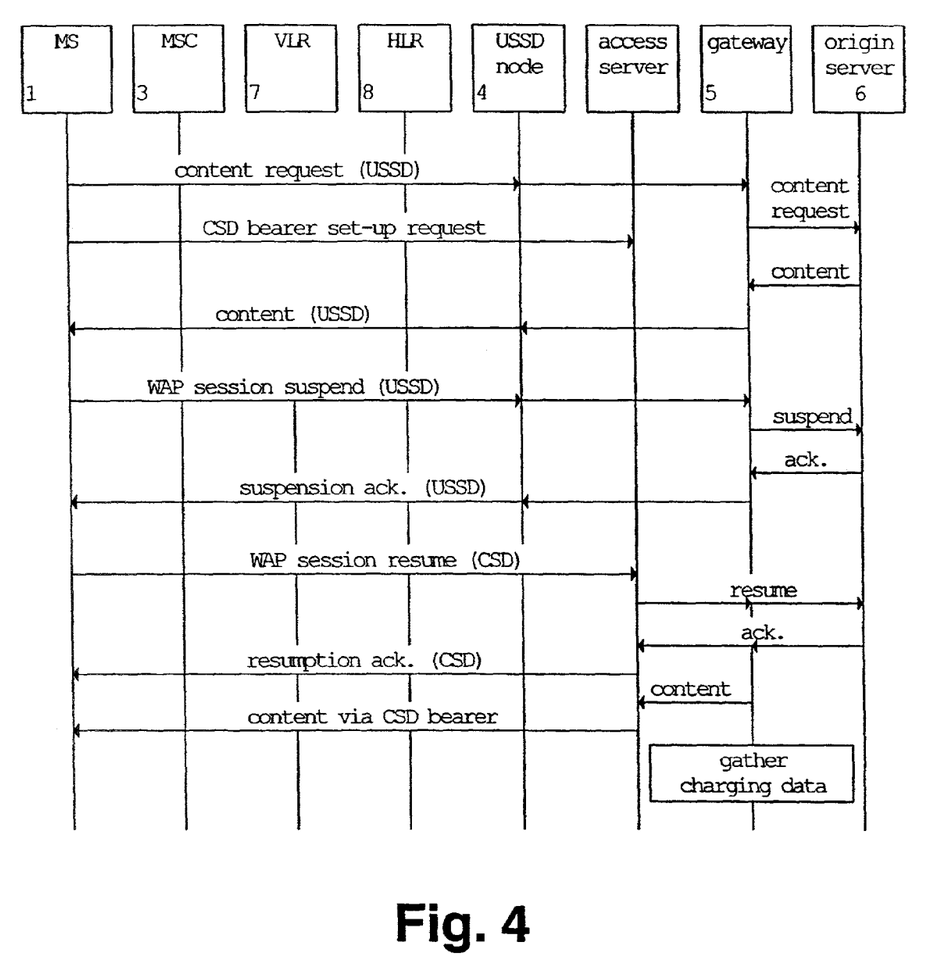
FIG. 4 shows an information flow diagram of another example of a data transmission method comprising a bearer change procedure according to the preferred embodiment of the present invention.

FIG. 4 shows message transmission diagram of a data transmission (e.g. downloading) from the origin server 6 to the mobile station 1, according to the third example. Initially, a USSD content request is transmitted from the mobile station 1 to the gateway 5 via the USSD node 4. The gateway 5 (e.g. detector 54) detects the respective MSISDN of the mobile station 1 and issues a corresponding content request to the origin server 6 which then generates a content information and supplies it to the gateway 5. The gateway 5 transmits the content information via the USSD node 4 to the mobile station 1 by using a USSD bearer. Then, the mobile station 1 initiates a bearer release message, e.g. a WSP Session Suspend message or the like, by using the initial USSD bearer. In response thereto, the gateway 5 issues a session suspend command (suspend PDU) to the origin server 6 which acknowledges the suspension. Then, the gateway 5 transmits a corresponding acknowledgement via the USSD bearer to the mobile station 1 and the bearer switch control unit 55 initiates a release of the USSD bearer.

Having received the suspension acknowledgement, the mobile station 1 initiates a CSD bearer set-up and issues a session resume request, e.g. a WSP Session Resume message or the like, to the gateway 5 by using the CSD bearer after it has been set up. Alternatively, the CSD bearer set-up may be initiated in parallel with the start of the initial transmission using the USSD bearer, to thereby speed up the communication. After the session resumption has been acknowledged by the origin server 6, the content retrieval is continued by using the CSD bearer.

Due to the combined use of the USSD bearer and the CSD bearer, both MSISDN and IP addresses are known to the gateway 5 which may then associate the MSISDN with the IP address to thereby gather billing or charging data per service. The charging data which may comprise the user or subscriber identity (MSISDN), the content retrieved (URL) and/or a content retrieval time may be gathered by the switch control unit 55. Then, the charging data may be forwarded to an operator billing or charging system.

It is noted that the blocks 51, 52, 54 and 55 shown in FIG. 2 may be implemented as hardware circuits or as software routines executed by a corresponding processing unit arranged at the gateway 5. As already mentioned, the gateway function may be provided at the origin server 6. In this case, the USSD node 4 and the MSC 3 may be directly connected to the origin server 6. Furthermore, the data transmission method and apparatus described in the preferred embodiment can be applied to any data transmission between end terminals of a telecommunication network, wherein the term "end terminal" is intended to cover also arbitrary network nodes, e.g. any network node from which a content can be retrieved. Moreover, the second bearer is not restricted to a CSD bearer. Other bearer types, such as a GPRS bearer, may be used instead of the CSD bearer. The above description of the preferred embodiment and the accompanying drawings are only intended to illustrate the present invention. The preferred embodiment of the invention may thus vary within the scope of the attached claims.

In summary, the present invention relates to a data transmission method and apparatus for performing a data transmission between end terminals of a telecommunication network, particularly a data transmission between an origin server and a mobile client. The data is transmitted from at least one of the end terminals using the first data bearer. Then, data transmission is switched from the first to the second data bearer, if a predetermined bearer need condition has been determined or in order to obtain a subscriber identity used for gathering charging data. Thereby, the network service provided by the operator can be improved, since the bearer switching allows an increase of the overall speed of the data transmission, an adaptation of the bearer bandwidth to the data amount, and a provision of the subscriber identity. The first data bearer may be a USSD or SMS data bearer, and the second data bearer may be a circuit-switched data bearer or a GPRS bearer, or vice versa.

What is claimed is:

1. A method comprising:
   initiating data transmission from an intelligent network access server to a mobile station using a first data bearer of a first type for transmitting data upon request for communication with the access server by the mobile station;
   receiving content by the access server from an origin server upon request for content by the mobile station and transmitting said content to the mobile station on the first data bearer of a first type;
   switching said data transmission to a second data bearer of a second type different from said first type, said second data bearer having a different set-up phase than the first data bearer, when said set-up phase of the second data bearer is completed and when a predetermined bearer need condition of said second data bearer has been determined, said predetermined bearer need condition being associated with the amount of data to be transmitted from the origin server to the mobile station as a result of said request for content, and continuing said data transmission on said second data bearer of a second type, wherein said data transmission delivers the content from the origin server to the mobile station, and
   determining an address number of said intelligent network access server by an intelligent network number translation, wherein said intelligent network number translation is determined by customized applications for mobile network enhanced logic support.

2. A method comprising:
   initiating data transmission from an intelligent network access server to a mobile station using a first data bearer of a first type for transmitting data;
   receiving content by the access server from an origin server upon request for communication with the access server by the mobile station and transmitting said content to the mobile station on the first data bearer of a first type;
   switching said data transmission to a second data bearer of a second type different from said first type said second data bearer having a different set-up phase than the first data bearer, when said set-up phase of the second data bearer is completed and when a predetermined bearer need condition of said second data bearer has been determined, said predetermined bearer need condition being associated with the amount of data to be transmitted from the origin server to the mobile station, wherein said data transmission is used for retrieving said requested content from said origin server, and
   determining an address number of said intelligent network access server by an intelligent network number translation, and wherein said intelligent network access server is arranged in a wireless application protocol gateway.

3. A method comprising:
   initiating data transmission from an access server to a mobile station using a first data bearer of a first type for transmitting data upon request for communication with the access server by the mobile station;
   receiving content by the access server from an origin server upon request for content by the mobile station and transmitting said content to the mobile station on the first data bearer of a first type;
   switching said data transmission to a second data bearer of a second type different from said first type, said second data bearer having a different set-up phase than the first data bearer, when said set-up phase of the second data bearer is completed and when a predetermined bearer need condition of said second data bearer has been determined, said predetermined bearer need condition being associated with the amount of data to be transmitted from the origin server to the mobile station as a result of said request for content, and continuing said data transmission on said second data bearer of a second type, wherein said data transmission delivers the content from the origin server to the mobile station, and wherein said switching is performed during downloading of said requested content using said first data bearer, so that remaining content of said requested content is downloaded using said second data bearer.

4. A method according to claim 3, wherein said predetermined bearer need condition is the completion of the set-up phase of said second bearer.

5. A method according to claim 4, wherein said first data bearer is an unstructured supplementary service data or short message service bearer, and said second data bearer is a circuit-switched data bearer.

6. A method according to claim 3, wherein the amount of data is determined from at least one of the following: a service address, a content size and a content type of a service information to be transmitted.

7. A method according to claim 3, wherein said predetermined bearer need condition is determined on the basis of a time duration since a last transmission request.

8. A method according to claim 3 wherein said first data bearer is a circuit-switched data bearer, and said second data bearer is a unstructured supplementary service data or short message service bearer.

9. A method according to claim 3, wherein said switching comprises a wireless application protocol session suspend and resume operation.

10. A method according to claim 9, wherein the wireless application protocol session is suspended via said first data bearer and resumed via said second data bearer.

11. An apparatus comprising:
a bearer control switch configured to control a transmitter for initiating a data transmission from an access server to a mobile station using a first data bearer of a first type for transmitting data; and
a detector configured to detect a predetermined bearer need condition;
wherein said bearer control switch is configured to switch said transmitter to a second data bearer of a second type different from said first type, said second data bearer having a different set-up phase than the first data bearer, based on completion of the set-up phase of the second data bearer and based on the detected predetermined bearer need condition, and configured to control said transmitter to continue the data transmission from said access server to said mobile station on the second data bearer,
wherein said predetermined bearer need condition is associated with the amount of data to be transmitted from an origin server to the mobile station via the access server as a result of a request for content from the mobile station to the access server.

12. An apparatus according to claim 11, wherein said predetermined bearer need condition is the completion of the set-up phase of said second bearer.

13. An apparatus according to claim 12, wherein said first data bearer is an unstructured supplementary service data or short message service bearer, and said second data bearer is a circuit-switched data bearer.

14. An apparatus according to claim 11, wherein an amount of data is determined from at least one of the following: a service address, a content size and a content type of a service information to be transmitted.

15. An apparatus according to claim 11, wherein said predetermined bearer need condition is determined on the basis of a time duration since a last transmission request.

16. An apparatus according to claim 11, wherein said first data bearer is a circuit-switched data bearer, and said second data bearer is an unstructured supplementary service data or short message service bearer.

17. An apparatus according to claim 11, wherein said apparatus is provided in a wireless application protocol gateway, and wherein said bearer control switch is configured to perform said switching by using a wireless application protocol session suspend and resume operation.

18. An apparatus comprising:
a bearer control switch configured to control a transmitter for initiating a data transmission from an access server to a mobile station using a first data bearer of a first type to transmit data from an origin server to the mobile station via the access server, wherein said initiating includes actual transmission of data from the access server using said first data bearer; and
a detector configured to detect a predetermined bearer need condition, wherein said bearer control switch is configured to switch said transmitter to a second data bearer of a second type different from said first type, said second data bearer having a different set-up phase than the first data bearer, based on completion of the set-up phase of the second data bearer and based on the detected predetermined bearer need condition, and configured to control said transmitter to continue the data transmission on the second data bearer of a second type from said access server to said mobile station, wherein said predetermined bearer need condition is associated with the amount of data to be transmitted as a result of a request for content.

19. An apparatus according to claim 18, wherein said first data bearer is an unstructured supplementary service data or short message service bearer, and a second data bearer is a circuit-switched data bearer or a general packet radio service bearer.

20. An apparatus according to claim 18, wherein said apparatus is provided in a wireless application protocol gateway, and wherein said bearer control switch is configured to perform said switching by using a wireless application protocol session suspend and resume operation.

21. An apparatus according to claim 18, wherein said predetermined bearer need condition is the completion of the set-up phase of said second data bearer.

22. An apparatus according to claim 18, wherein said predetermined bearer need condition is determined on the basis of a time duration since a last transmission request.

23. An apparatus according to claim 18, wherein said data transmitted by said access server is received from an origin server.

24. An apparatus according to claim 23 wherein said bearer control switch is configured to control said transmitter so as to switch to said second data bearer during a downloading of said requested content from said origin server to said mobile station using said first data bearer, so that remaining content of said requested content is swapped to said second data bearer.

25. An apparatus according to claim 18, wherein the detector is configured to detect a subscriber identity from the data transmission with said first data bearer, wherein said bearer control switch is configured to gather subscriber charging data by using said detected subscriber identity, and wherein said subscriber identity is a mobile station integrated services digital network.

26. A terminal equipment for a telecommunication network, comprising:
an input device configured to activate a browser function; and
a user agent responsive via the browser function to said input device, configured to request content retrieval from an origin server via an access server by using a first data bearer of a first type for transmitting data and a second data bearer of a second type different from said first type for transmitting data, said second data bearer having a different set-up phase than the first data bearer, wherein said content retrieval includes actual data and is performed by using said first data bearer during set-up of the second data bearer and switching to said second data bearer after said set-up of the second data bearer and upon detection of a predetermined bearer need condition, said predetermined bearer need condition being associated with the amount of data to be transmitted as a result of said requested content retrieval.

27. A terminal equipment according to claim 26, wherein said first data bearer is an unstructured supplementary service data or short message service data bearer, and said second data bearer is a circuit-switched data bearer or a general packet radio service bearer.

28. A terminal equipment according to claim 26, wherein said terminal equipment is provided in a mobile station.

29. An apparatus comprising:
   means for controlling a transmitter for initiating a data transmission from an access server to a mobile station using a first data bearer of a first type for transmitting data upon request for communication with the access server by the mobile station; and
   means for detecting a predetermined bearer need condition; wherein said means for controlling controls said transmitter so as to switch to a second data bearer of a second type different from said first type, said second data bearer having a different set-up phase than the first data bearer, based on completion of the set-up phase of the second data bearer and based on the detected predetermined bearer need condition, and configured to control said transmitter to continue the data transmission from said access server to said mobile station on the second data bearer, wherein said predetermined bearer need condition is associated with the amount of data to be transmitted as a result of said request for content, wherein said data transmitted by said access server is received from an origin server, and wherein said means for controlling switches said transmitter to said second data bearer during a downloading of said requested content from said origin server to said mobile station using said first data bearer, so that remaining content of said requested content is downloaded using said second data bearer.

30. An apparatus according to claim 29, wherein said predetermined bearer need condition is the completion of the set-up phase of said second bearer.

31. A method comprising:
   initiating data transmission from an access server to a mobile station using a first data bearer of a first type for transmitting data upon request for communication with the access server by the mobile station;
   receiving content by the access server from an origin server upon request for content by the mobile station and transmitting said content to the mobile station on the first data bearer of a first type;
   switching said data transmission to a second data bearer of a second type different from said first type, said second data bearer having a different set-up phase than the first data bearer, when said set-up phase of the second data bearer is completed and when a predetermined bearer need condition of said second data bearer has been determined, said predetermined bearer need condition being associated with the amount of data to be transmitted from the origin server to the mobile station as a result of said request for content.

32. A method according to claim 31, wherein said predetermined bearer need condition is the completion of the set-up phase of said second data bearer.

33. A method according to claim 31, wherein said predetermined bearer need condition is determined on the basis of a time duration since a last transmission request.

34. A method according to claim 31, further comprising using a subscriber identity, obtained from the data transmission with said first data bearer, for gathering subscriber charging data, wherein said subscriber identity is a mobile station integrated service digital network.

\* \* \* \* \*